(12) United States Patent
Levin et al.

(10) Patent No.: US 10,174,824 B2
(45) Date of Patent: Jan. 8, 2019

(54) HYDROSTATIC TRANSMISSION AND METHOD OF OPERATION

(71) Applicant: Concept & Design Ltd., Atlit (IL)

(72) Inventors: Shalom Levin, Atlit (IL); Asaf Levin, Atlit (IL)

( * ) Notice: Subject to any disclaimer, the term of this patent is extended or adjusted under 35 U.S.C. 154(b) by 0 days.

(21) Appl. No.: 15/563,620

(22) PCT Filed: Apr. 6, 2016

(86) PCT No.: PCT/IL2016/050363
§ 371 (c)(1),
(2) Date: Oct. 2, 2017

(87) PCT Pub. No.: WO2016/166746
PCT Pub. Date: Oct. 20, 2016

(65) Prior Publication Data
US 2018/0106352 A1    Apr. 19, 2018

Related U.S. Application Data

(60) Provisional application No. 62/318,239, filed on Apr. 5, 2016, provisional application No. 62/146,310, filed on Apr. 12, 2015.

(51) Int. Cl.
*F16H 47/04*    (2006.01)
*F16H 57/08*    (2006.01)
(Continued)

(52) U.S. Cl.
CPC ............. *F16H 47/04* (2013.01); *F16H 39/36* (2013.01); *F16H 39/40* (2013.01); *F16H 57/08* (2013.01);
(Continued)

(58) Field of Classification Search
CPC .... F16H 47/04; F16H 2047/045; F16H 39/36; F16H 39/40; F16H 39/02; F16H 39/04; F16H 39/22
See application file for complete search history.

(56) References Cited

U.S. PATENT DOCUMENTS

| 1,785,386 A | 12/1930 | McIntyre |
| 2,652,911 A | 9/1953 | Somers |

(Continued)

FOREIGN PATENT DOCUMENTS

| CA | 2250476 | 10/1997 |
| DE | 3100319 | 8/1982 |

(Continued)

*Primary Examiner* — Mark J Beauchaine
(74) *Attorney, Agent, or Firm* — Edward Langer Adv & Patent Attorney

(57) ABSTRACT

A hydrostatic transmission which utilizes a combination of a multiple planetary gear pump and a multiple planetary gear motor encased within one compact unit sealed so as to direct passage of hydraulic fluid between the combination thereof. The hydrostatic transmission comprises a power component provided with a plurality of planetary gears that can provide power to at least one load delivered by at least one of the plurality of planetary gears. The power component is configured with an integrated oil-switching mechanism that controls the rotational speed delivered to the load. The hydrostatic transmission is provided in one compact, sealed casing suitable for use in vehicles, having an output shaft optionally mechanically connected directly to the wheels of a vehicle drive. The inventive hydrostatic transmission operates without the need for lengthy pressure hoses and related connectors and fittings for cycling hydraulic fluid along needed flow paths.

19 Claims, 16 Drawing Sheets

(51) Int. Cl.
*F16H 39/36* (2006.01)
*F16H 39/40* (2006.01)
*F16D 31/04* (2006.01)

(52) U.S. Cl.
CPC ........ *F16D 31/04* (2013.01); *F16H 2047/045* (2013.01)

(56) References Cited

U.S. PATENT DOCUMENTS

| | | | | |
|---|---|---|---|---|
| 4,078,453 | A * | 3/1978 | Brace | F16D 31/04 192/61 |
| 4,232,570 | A * | 11/1980 | Gibson | F16H 47/04 477/68 |
| 6,030,196 | A * | 2/2000 | Coeuret | F04C 2/14 418/165 |
| 6,588,207 | B1 * | 7/2003 | Pouliot | F16D 31/04 418/201.3 |
| 2009/0088280 | A1 | 4/2009 | Warren | |

FOREIGN PATENT DOCUMENTS

| | | |
|---|---|---|
| GB | 253454 | 6/1926 |
| GB | 194954 | 3/1940 |
| GB | 798214 | 7/1958 |

* cited by examiner

HYDROSTATIC TRANSMISSION AND METHOD OF OPERATION

FIELD OF THE INVENTION

The present invention generally relates to the field of hydrostatics engineering, and more particularly, to a hydrostatic transmission which utilizes a combination of a multiple planetary gear pump and a multiple planetary gear motor encased within one compact unit sealed so as to direct passage of hydraulic fluid between the combination thereof.

BACKGROUND OF THE INVENTION

Both hydraulic gear pumps and hydraulic gear motors are well-known in the field of hydro-mechanical development. A hydraulic gear motor is a mechanical device which converts hydraulic pressure and flow into torque and angular displacement (rotation). Conceptually, a hydraulic gear motor is the converse of a hydraulic gear pump. A hydraulic gear motor is usually designed for introduction of high-pressure hydraulic fluid at an inlet and egress of hydraulic fluid at a low pressure at a subsequent outlet, so as to convert hydraulic power into rotary mechanical motion on an output shaft to drive a load. A conventional hydraulic gear pump, on the other hand, is designed for low-pressure fluid flow into an inlet and requires high-pressure fluid flow at an outlet.

Hydraulic gear pumps and gear motors are commonly combined to form hydraulic drive systems. One or more hydraulic gear pumps, coupled to one or more hydraulic gear motors, constitute a hydrostatic transmission which today has application in motor vehicles, agricultural and industrial machinery, and in many other mechanical devices and equipment.

The major disadvantage of conventional prior art gear transmissions is that they cannot supply a wide range of gear ratios all in one compact unit.

Another disadvantage is that prior art hydrostatic transmissions are generally connected mechanically to a differential and not directly to the drive wheels of a vehicle where operation would be more efficient.

Yet another disadvantage of prior art hydrostatic transmissions is that hoses, tubes, connectors and adapters are generally required for hydraulic fluid to be transferred between components.

SUMMARY OF THE INVENTION

Accordingly, it is a broad object of the present invention to overcome the above disadvantages and limitations of the prior art by providing a compact, hydrostatic transmission comprising a power component (hereinafter, "power component") provided with a plurality of planetary gears that can provide power to at least one load delivered by at least one of the plurality of planetary gears.

Another object of the present invention is to provide a hydrostatic transmission comprising a power component and an integrated oil-switching mechanism that operates in one compact, sealed casing suitable for use in vehicles.

A further object of the present invention is to provide a hydrostatic transmission having an output shaft optionally mechanically connected directly to the wheels of a vehicle drive.

Yet another object of the present invention is to provide a hydrostatic transmission that operates without the need for lengthy pressure hoses and related connectors and fittings for cycling hydraulic fluid along needed flow paths.

In accordance with a preferred embodiment of the present invention, there is provided a hydrostatic transmission comprising:

a combination of a first and a second power component configurable to be operated in a multiple gear pump mode and a multiple gear motor mode, respectively, each of the combination comprising:

a plurality of planetary gears mounted on respective planetary gear shafts;

a complementary gear mounted on a shaft and enmeshed with said plurality of planetary gears;

a fluid inlet disposed on one side of and in close proximity adjacent to each of said plurality of planetary gears for ingress of hydraulic fluid;

a fluid outlet disposed on an opposite side of and in close proximity adjacent to each of said plurality of planetary gears for egress of hydraulic fluid; and a carrier stator plate in which said plurality of planetary gears and said complementary gear are aligned in the same plane as said carrier stator plate, and are rotatably mounted therein, wherein said complementary gear shaft of said first power component is mechanically connected to a power source, and said complementary gear shaft and at least one of said planetary gear shafts of said second power component is mechanically connected to a load, wherein when said first power component operates in a mode as a multiple gear pump in conjunction with said second power component operating in a mode as a multiple gear motor, said hydraulic fluid is introduced at a low hydraulic pressure into at least one of said respective fluid inlets, and said complementary gear impels said plurality of planetary gears to rotate in concert and thereby supply a predetermined fluid flow to said fluid outlet of said first power component for egress at high pressure therefrom; and wherein said hydraulic fluid is supplied from said first power component into at least one of said fluid inlets of said second power component at a high pressure so as to impel at least one of said plurality of planetary gears of said second power component to rotate, thereby also causing said respective complementary gear to rotate such that torque is provided to both said complementary gear shaft and at least one of said plurality of planetary gear shafts at a predetermined controllable speed thereby efficiently operating said hydrostatic transmission.

In accordance with a preferred method of the present invention, there is provided a method for operating a hydrostatic transmission comprising:

providing a combination of a first and a second power component configurable to be operated in a multiple gear pump mode and a multiple gear motor mode, respectively, each of the combination comprising:

a plurality of planetary gears mounted on respective planetary gear shafts;

a complementary gear mounted on a shaft and enmeshed with said plurality of planetary gears;

a fluid inlet disposed on one side of and in close proximity adjacent to each of said plurality of planetary gears for ingress of hydraulic fluid;

a fluid outlet disposed on an opposite side of and in close proximity adjacent to each of said plurality of planetary gears for egress of hydraulic fluid; and a carrier stator plate in which said plurality of planetary gears and said complementary gear are aligned in the same plane as said carrier stator plate, and are rotatably mounted therein, and operating said first power component in a mode as a multiple gear pump in conjunction with operating said second power component in a mode as a multiple gear motor, wherein said complementary gear shaft of said first power component is mechanically connected to a power source, and wherein said complementary gear shaft and at least one of said planetary gear shafts of said second power component is mechanically connected to a load, said operating comprising:

introducing said hydraulic fluid at a low hydraulic pressure into at least one of said respective fluid inlets of said first power component, such that said complementary gear impels said plurality of planetary gears to rotate in concert and thereby supply a predetermined fluid flow to said fluid outlet of said first power component for egress at high pressure therefrom; and introducing said hydraulic fluid from said fluid outlet of said first power component into said second power component, such that said hydraulic fluid is supplied from said first power component into at least one of said fluid inlets of said second power component at a high pressure so as to impel at least one of said plurality of planetary gears of said second power component to rotate, thereby also causing said respective complementary gear to rotate such that torque is provided to both said complementary gear shaft and at least one of said plurality of planetary gear shafts at a predetermined controllable speed thereby efficiently operating said hydrostatic transmission.

The features and advantages of the present invention are further described hereinbelow, taken in conjunction with the drawings.

BRIEF DESCRIPTION OF THE DRAWINGS

For a better understanding of the invention with regard to the embodiments thereof, reference is made to the accompanying drawings, in which like numerals designate corresponding elements or sections throughout and wherein:

FIG. 1B is a cross-section view of the general construction of another prior art external-gear motor/external-gear pump;

DETAILED DESCRIPTION OF THE INVENTION

Figure 1A:
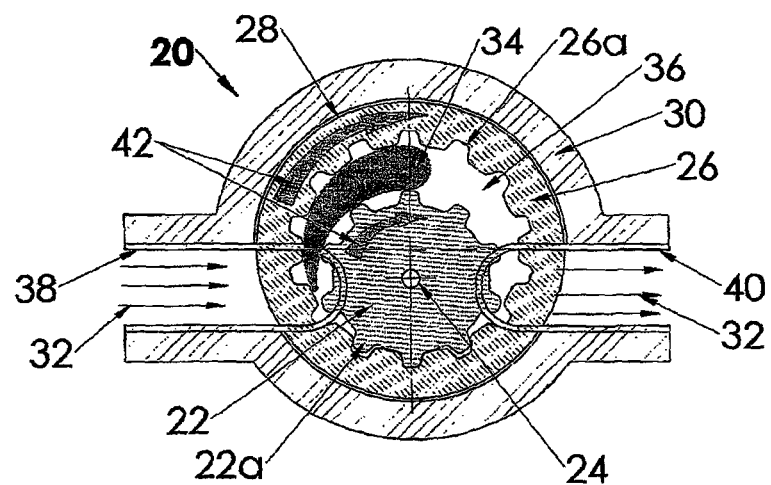
FIG. 1A is a cross-section view showing the general construction of a prior art internal-gear motor/internal-ge

FIG. 1A is a cross-section view showing the general construction of a prior art internal-gear pump 20. Prior art gear pump 20 comprises a single, external gear 22 mounted on a drive shaft axle 24 which is mechanically connected to a motor (not shown) for operating gear pump 20. A rotatable, internal gear-ring 26 having internal teeth 26a is fitted closely around the perimeter of an inside wall 28 of sealed housing 30. Housing 30 encloses both gears 22, 26 and is intended to securely retain any hydraulic fluid 32 circulated within gear pump 20. A static separator 34 is deployed between external gear 22 and ring-gear 26 to provide a closed chamber 36 defined by the space formed between the teeth 22a of external gear 22 and the teeth 26a of internal gear 26 and around the static separator 34. When hydraulic fluid 32 (shown as flow arrows) is admitted into gear pump 20 at a low hydraulic pressure through inlet 38, hydraulic fluid 32 is impelled by the rotation of external gear 22 acting as a drive gear to concurrently rotate ring-gear 26 so that the hydraulic fluid 32 admitted into fluid inlet 38 at a low hydraulic pressure is forced to traverse the inner chamber 36 and exit through outlet 40 at a high hydraulic pressure providing a hydraulic gear pump 20.

Figure 1B:
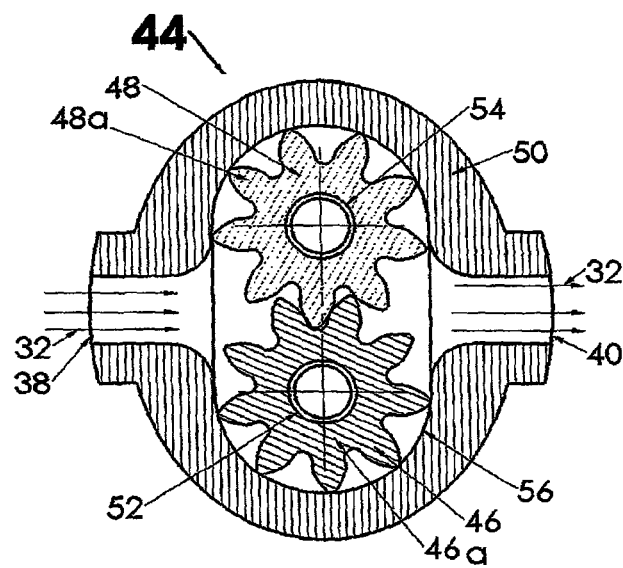
FIG. 1B is a cross-section view of the general construction of a dual-use, prior art external-gear pump/motor.

FIG. 1B is a cross-section view of the general construction of a dual-use, prior art external-gear pump/motor.

Gear pump/gear motor 44 comprises two enmeshed external-gears 46, 48 rotatable on shaft/axles 52, 54, respectively, all encased in a housing 50 which is provided with a fluid inlet 38 and a fluid outlet 40 (both shown open, but generally sealed) for hydraulic fluid 32 to be introduced into fluid inlet 38.

Hydraulic fluid 32 enters inlet 38 at a low hydraulic pressure and is ejected at a high pressure from fluid outlet 40 when gear pump/gear motor 44 is configured as a gear pump. Furthermore, when gear pump/gear motor 44 is configured as a gear pump, shaft 52 (or alternatively, shaft 54), is mechanically connected to a motor (not shown) and activated. Hydraulic fluid 32 rotates around both external-gears 46, 48 to cause hydraulic fluid 32 to fill the interstices between the teeth 46a, 48a respectively, of external-gears 46, 48 until forced emergence from outlet 40 at a high pressure.

Operating in a gear motor mode, gear pump/gear motor 44 basically operates in a mirror image of the operation as a gear pump. The components are the same, but the input and output hydraulic pressures are reversed. Shaft axle 52 or alternatively shaft axle 54 are mechanically connected to an outside motor (not shown) in order to apply torque to an external load for operation of various mechanical tools and devices. Instead of the outlet 40 having a high-pressure hydraulic fluid 32 inlet 38 introduces hydraulic fluid 32 at a high pressure and egress from outlet 40 is then at a lower hydraulic pressure. Also note that the enmeshed external gears 46,48 rotate freely when impelled, being mounted on shafts 52, 54 respectively, inside housing 50 with teeth 46a and 48a in close proximity to an inner wall 56 of housing 50 in order to form a seal to prevent hydraulic fluid 32 from backing up. Hydraulic fluid 32 is carried by rotary motion of external gears 46, 48 until exiting at outlet 40.

Figure 2:
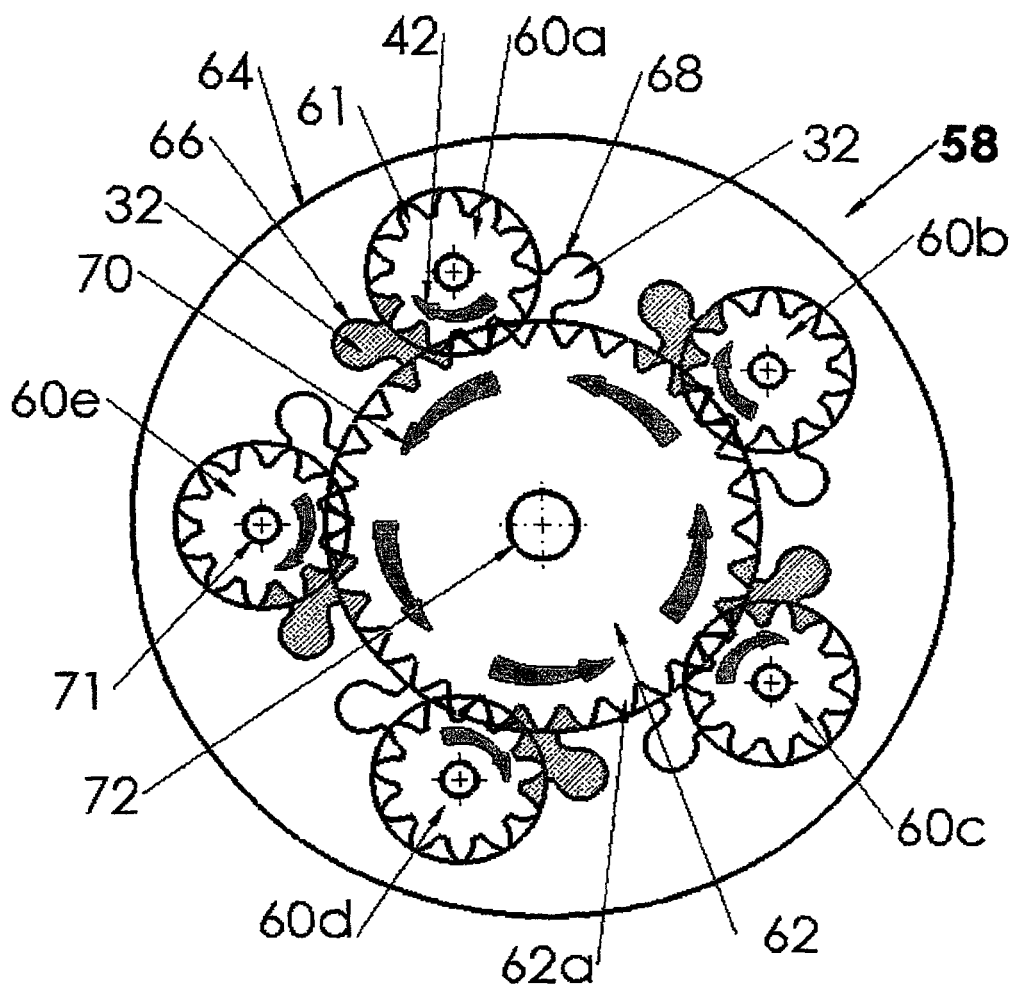
FIG. 2 is a schematic view of a preferred embodiment of the present invention wherein a power component of a hydraulic transmission operates in motor mode provided with a sun gear whose teeth are enmeshed with a plurality of equal-sized, planetary, external-gears to act as multiple gear motors when operated in accordance with the principles of the present invention.

FIG. 2 is a schematic view of a preferred embodiment of the present invention wherein a power component 58 operates in a mode as a multiple-planetary-gear motor. A plurality of planetary external-gears 60a-60e (hereinafter designated as 'planetary gears') are operable individually or in any combination as multiple gear motors when the power component 58 is configured in this mode in accordance with the principles of the present invention.

For the sake of simplicity and clarity, planetary gear 60a in the various drawings, FIGS. 2-6 is used as a model for detailed markings and call-out reference numbers that are identical to those for the other, equal-sized planetary gears 60b-60e. So too, other like elements and functions are described in relation to planetary gear 60a in the respective drawings, FIGS. 2-6.

The power component 58 comprises, in a preferred embodiment of the present invention, a plurality of planetary gears 60a-60e of equal size arranged around the outside circumference of a centrally disposed complementary gear 62, provided with external teeth 61. Due to the planetary arrangement of gears 60a-60e in FIG. 2, complementary gear 62 comprises what is generally known as a sun gear. Planetary gears 60a-60e are rotatably mounted within the plane of a carrier stator plate 64 and are free to rotate as described further herein.

There are shown, by way of example, five planetary gears 60a-60e which are each provided with a fluid inlet 66 and a fluid outlet 68 for ingress and egress, respectively, of hydraulic fluid 32 provided to multiple gear motor 58. Fluid inlet 66 and a fluid outlet 68 are preferably formed within carrier stator plate 64 by machining.

In this mode, each fluid inlet 66 of multiple-planetary-gear motor 58 can be selectively used to introduce hydraulic fluid 32 at a high pressure (indicated by dark hatch lines) and each respective fluid outlet 68 is subsequently used to release the hydraulic fluid 32 at a low pressure after flowing around respective planetary gears 60a-60e.

Each of the plurality of planetary gears 60a-60e has a clockwise direction of rotation (shown by clockwise arrows 42) imparted by the high pressure of hydraulic fluid 32 upon the planetary gear teeth 61 of the respective plurality of planetary gears 60a-60e and simultaneously upon complementary gear 62 which rotates in a counterclock-wise direction indicated by arrows 70. Complementary gear 62 revolves with output shaft axle 72 to provide torque to a load shaft (not shown) of an outside load connected mechanically to shaft axle 72. Power component 58, when all six gears 60a-60e, 62 are operated together, produces maximum torque output on output shaft axle 72 when connected to a load.

The five planetary gears 60a-60e, as shown in FIG. 2, by way of example, are arranged in a compact construction which function in the mode of multiple gear motors. Alternatively, each of the plurality of planetary gears 60a-60e may be operated individually or in any combination or number of planetary gears. Since there are only six gears 60a-60e, 62 in total involved in this preferred embodiment of the present invention, where ten gears are generally required for the same effect in conventional, prior art external-gear motor construction (see FIG. 1B), power component 58, operating in the mode of a multiple gear motor is both lower in cost to produce, more compact, and has a work load that is five times as effective and powerful as prior art external-gear motors.

Figure 3:
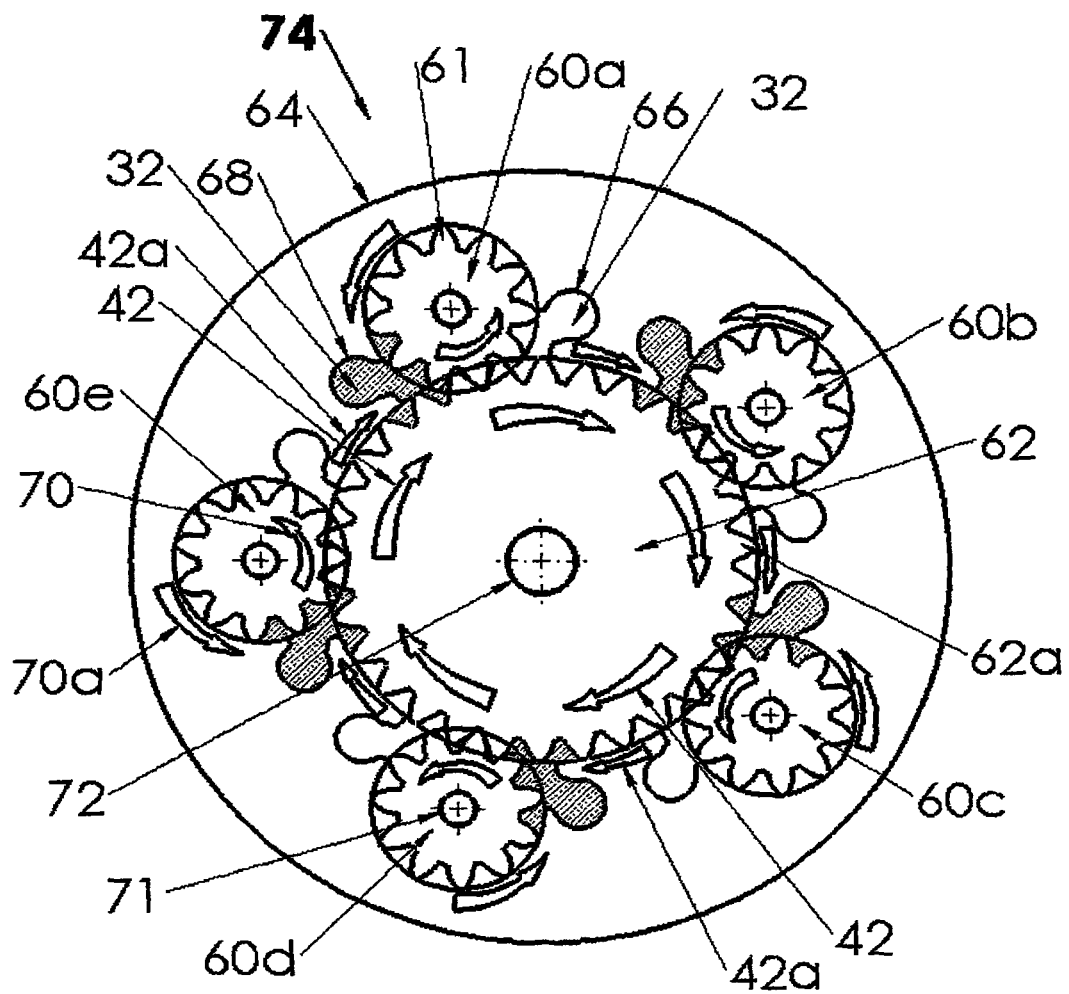
FIG. 3 is a schematic view of an alternate embodiment of the present invention as shown in FIG. 2, but wherein the power component operates in pump mode provided with a sun gear whose teeth are enmeshed with a plurality of equal-sized, planetary, external-gears to act as multiple, planetary gear pumps when operated in accordance with the principles of the present invention.

FIG. 3 is a schematic view of an alternate embodiment of the present invention as shown in FIG. 2, wherein the power component 74 operates in the mode of a multiple-planetary-gear pump in accordance with the principles of the present invention.

A centrally disposed complementary gear 62 and a plurality of equal-sized planetary gears 60a-60e arranged about complementary gear 62 are shown enmeshed and lying within the plane of carrier stator plate 64 so as to be freely rotatable. For each of the plurality of planetary gears 60a-60e, there is an associated fluid inlet 66 and fluid outlet 68 for providing hydraulic fluid 32 to at least one of the plurality of planetary gears 60a-60e.

It should be noted that the power component 74 of FIG. 3 is provided with five planetary gears 60a-60e, only by way of example, but as few as two and a greater number of equal-sized planetary gears may optionally be utilized in accordance with the principles of the present invention.

When complementary gear 62 is mechanically connected to an input drive shaft 76, hydraulic fluid 32 is introduced at a low hydraulic pressure into at least one of an associated fluid inlet 66 of a respective at least one of the plurality of planetary gears 60a-60e and is trapped and rotatably drawn between the teeth 61 of at least one of the planetary gears 60a-60e by the complementary gear 62 operated as a sun gear so as to flow in the direction shown by arrows 42a towards a fluid outlet 68 where the hydraulic fluid 32 is ejected under high pressure.

In the embodiment of the present invention shown in FIG. 3, there are provided five planetary gears 60a-60e, by way of example. Thus, in the present embodiment of the invention, the power component 74 operating in the mode of a multiple gear pump, advantageously requires only six gears as opposed to the prior art external-gear pump of FIG. 1B which would require ten gears to perform as well and as efficiently as multiple gear pump 74.

Figure 4:
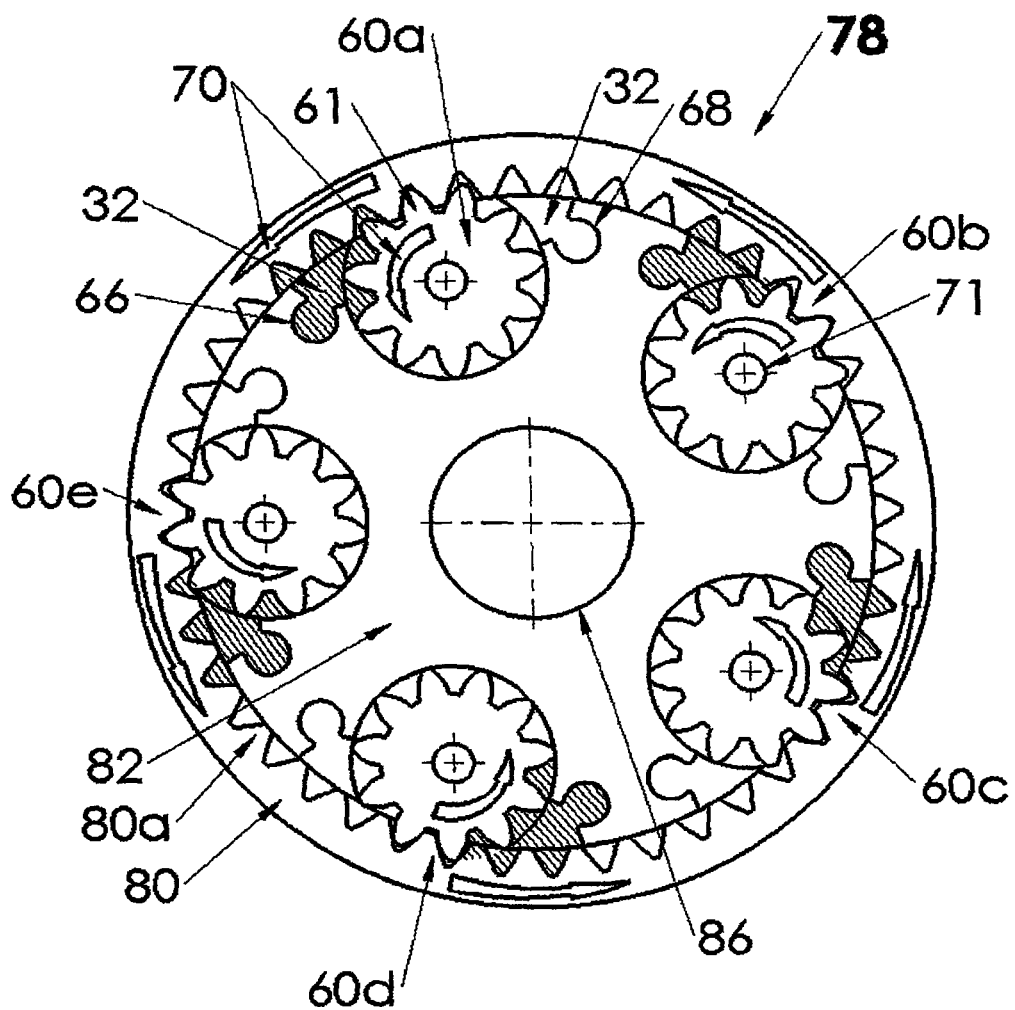
FIG. 4 is a schematic view of yet another embodiment of the present invention wherein the power component operates in motor mode, with a plurality of planetary-gears engaged with an internal, ring-gear to act as multiple, planetary gear motors when operated in accordance with the principles of the present invention.

FIG. 4 is a schematic view of yet another embodiment of the present invention wherein the power component 78 comprises a plurality of equal-sized planetary gears 60a-60e arranged about and engaged with a complementary gear 80 operating in the mode of a multiple-planetary-gear motor in accordance with the principles of the present invention.

Power component 78 comprises a plurality of planetary gears 60a-60e of equal size embedded in a carrier stator plate 82. Each of the planetary gears 60a-60e is provided on one side with a fluid inlet 66 in close proximity thereto for introducing high-pressure hydraulic fluid (high pressure indicated by hatched lines) into hydraulic power converter 78 and on an adjacent side provided with a fluid outlet 68 for releasing low-pressure hydraulic fluid 32 therefrom. The planetary gears 60a-60e are inwardly arranged in respect to internal-ring-gear 80 so that teeth 61 of planetary gears 60a-60e engage with the internal teeth 80a of complementary gear 80 provided with an output shaft 86 aligned along a central axis (marked with an axis center sign) thereof for mechanical connection to a power source (not shown). In the embodiment of the invention shown in FIG. 4, complementary gear 80 comprises an internal-ring-gear.

When planetary gears 60a-60e are engaged and operated with internal-ring-gear 80, the planetary gears 60a-60e operatively define five compact gear motors, by way of example, although the number actually used may be varied by selective distribution of the hydraulic fluid 32 to the respective fluid inlets 66 for each of the plurality of planetary gears 60a-60e to be activated. The five gear motors defined by the five planetary gears 60s-60e are caused to rotate counterclockwise (as shown by arrows 70), being propelled by the high-pressure from hydraulic fluid 32 fed into fluid inlets 66. The internal-ring-gear 80 engaged with the five planetary gears 60a-60e also rotates in the counterclockwise direction shown by arrow 70 and provides a torque to the internal-ring-gear output shaft axle 86. The hydraulic fluid 32 is released at a low hydraulic pressure through each of the nearby respective fluid outlets 68.

It should be noted that the five external gear motors represented by planetary gears 60a-60e in this embodiment of the present invention are constructed in a compact unit. Only five planetary gears 60a-60e and a single internal-ring-gear 80 are involved, whereas in conventional construction of prior art external-gear motors (see 46, 48 in FIG. 1B) ten gears are needed to produce the same power output.

Aside from operating as a compact and efficient multiple gear motor with planetary gears 60a-60e, the embodiment of the invention shown in FIG. 4 dispenses with the need for most if not all external tubes, hoses and related connectors and fittings for cycling hydraulic fluid 32 to and from fluid inlet 66 to outlet 68 by machining the carrier stator plate 82 with appropriately placed fluid pathways (not shown).

Figure 5:
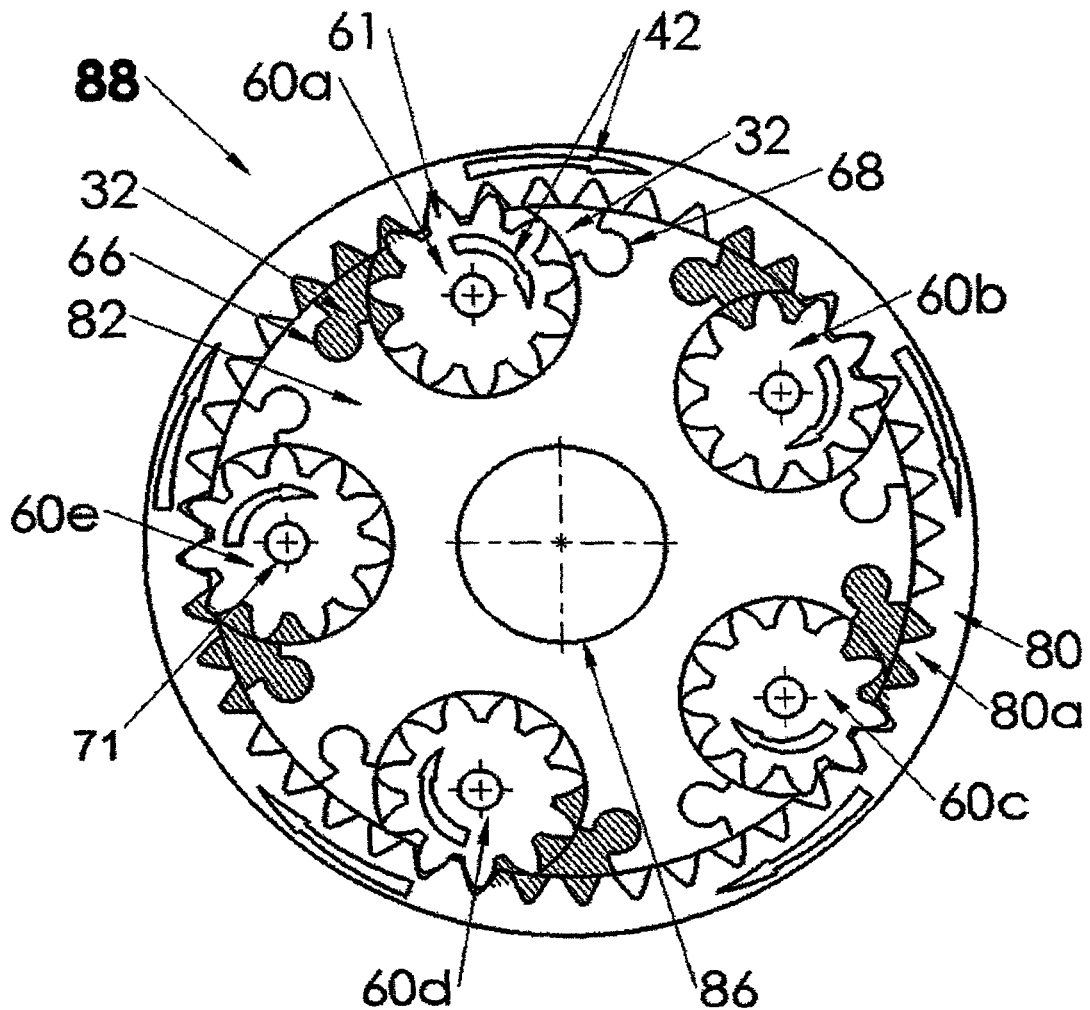
FIG. 5 is a schematic view of still another embodiment of the present invention as shown in FIG. 4, but wherein the power component operates in pump mode, with the plurality of planetary gears acting as multiple, planetary gear pumps.

FIG. 5 is a schematic view of still another embodiment of the present invention as shown in FIG. 4, wherein a power component 88 operates in the mode of a multiple-planetary-gear pump provided with a complementary gear 80 disposed so as to operate as an internal-ring-gear enmeshed with a plurality of planetary gears 60a-60e in accordance with the principles of the present invention.

Power component t 88 comprises five planetary gears 60a-60e and a complementary gear 80 operating as an internal-ring-gear, all rotatably embedded in a carrier stator plate 82. In the embodiment of the present invention shown in FIG. 5, when fully engaged, only six gears (60a-60e and 80) are involved instead of ten gears as in the conventional construction of a prior art internal-gear pump (see for example 20 in FIG. 1A)

Referring now to FIG. 5 in detail, there is provided a power component 88 operating in the mode of an internal-gear pump and comprised of a plurality of planetary gears 60a-e disposed within the plane of carrier stator plate 82 and freely rotatable (arrows 42). Planetary gears 60a-60e are of equal size and arranged so that their teeth 61 engage with the teeth 80a of complementary gear 80 comprising an exterior ring gear which also lies within the plane of carrier stator plate 82.

Although there are five planetary gears 60a-60e, by way of example, the number actually used may be varied and is under the control of a user as heretofore described (see description of FIG. 4).

One or more of these five planetary gears 60a-60e can function as multiple gear pumps provided with an associated low-pressure fluid inlet 66 and a high-pressure fluid outlet 68 (high pressure indicated by hatched lines) for hydraulic fluid 32. This is in contrast to the arrangement for the power component 78 operating in the mode of a multiple gear motor as shown in FIG. 4 where the high hydraulic pressure is applied at the fluid inlet 66. Also, note that the rotation of gears 60a-e, 80 is counterclockwise as opposed to the direction of the similar gears 60a-e,80 shown in FIG. 4 for the power component 78 operating in the mode of a multiple gear motor.

When hydraulic power converter 88 is operated, internal-ring-gear 80 is caused to rotate clockwise (shown by arrows 42) being propelled by the central, input drive shaft 86 which may optionally be a shaft axle 86a of complementary gear 80 or indirectly through at least one shaft axle 92 of the five planetary gears 60a-60e which engage and rotate together in the same direction with internal-ring-gear 80 (shown by arrows 42) and transfer hydraulic fluid 32 to a respective fluid outlet 68.

Aside from being compact and efficient, the embodiment of the present invention shown in FIG. 5 dispenses with the need for most of the multiple internal tubes, hoses and related connectors and fittings for cycling hydraulic fluid to and from an inlet to an outlet and avoids the problem with possible oil fluid leaks and spills. Both fluid inlet 66 and fluid outlet 68 are formed by machining the carrier stator plate 64 for appropriate distribution of hydraulic fluid 32 to and from fluid inlet 66 to outlet 68 by machining the carrier stator plate 82 with appropriately placed fluid pathways (not shown).

Figure 6:
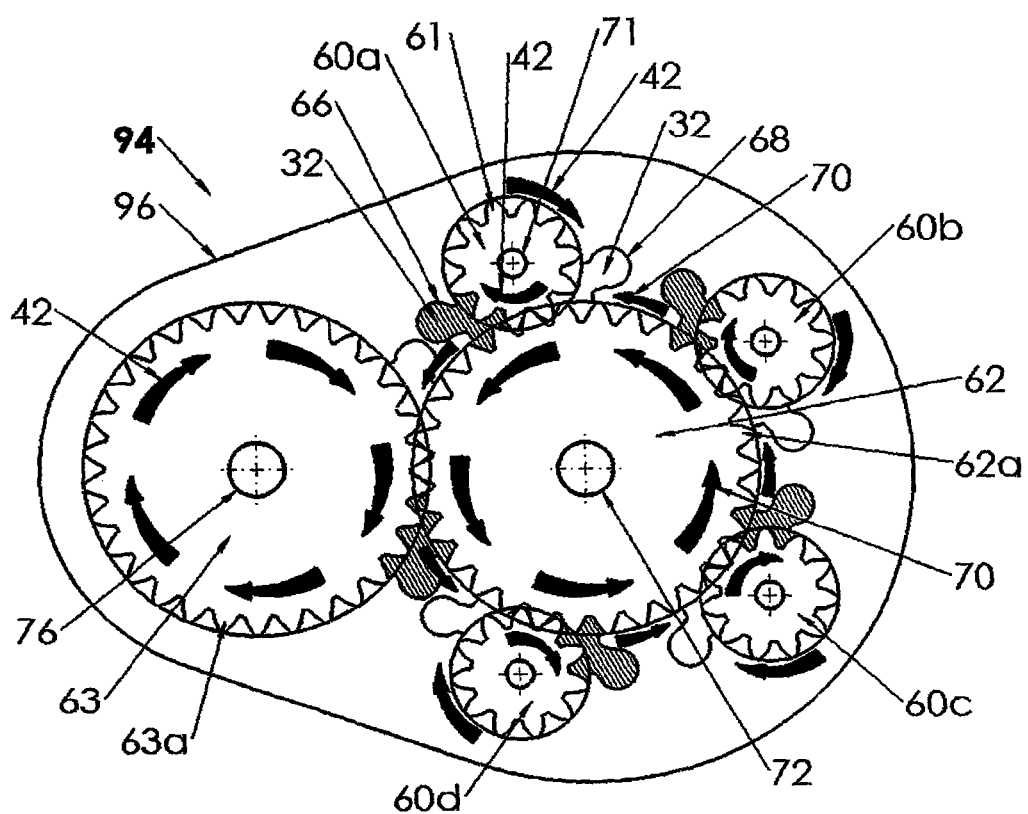
FIG. 6 is a schematic view of a further embodiment of the present invention wherein the power component is provided with a sun gear enmeshed with a plurality of planetary gears, including one enlarged planetary gear so as to be selectively operable in one of a pump mode and a motor mode.

FIG. 6 is a schematic view of another embodiment of the present invention provided with a plurality of different-sized planetary gears 63, 60a-60d. Power component 94 comprises different-sized planetary gears 63, 60a-60d enmeshed with a central complementary gear 62 acting as a sun gear and associated respective fluid inlets 66 and fluid outlets 68.

When activated, power component 94 operates in a mode as one of a multiple gear motor and, alternatively, as a multiple gear pump in accordance with the principles of the present invention.

For the sake of brevity and clarity, the embodiment of the invention shown in FIG. 6 will generally be designated hereinafter as a dual-mode power component 94 since it is possible to operate this component in either mode, i.e., a multiple gear pump and a multiple gear motor. When operated in the mode of a multiple gear motor 58, the operation is similar to that described in relation to FIG. 2.

When operated in the mode as a multiple gear pump 74, the operation is similar to that described in relation to FIG. 3.

In general, power component 94 comprises a set of four planetary gears 60a-60d all of equal size, and a fifth, larger gear 63, arranged around the perimeter of a centrally disposed complementary gear 62. Gears 60a-60d, 63, and 62 are rotatably mounted within the plane of a carrier stator plate 96. Each of the five planetary gears 60a-60d and 61 are provided with a fluid inlet 66 and a fluid outlet 68. For the sake of simplicity, planetary gear 60a is used as a model for detailed markings and call-out reference numbers that are identical to those for the other planetary gears 60b-60d and 63 and related elements including direction arrows 42 and 42a as explained hereinbefore in relation to FIG. 2.

When operated in the mode as a multiple gear motor (see 58 in FIG. 2) each fluid inlet 66 is used to introduce hydraulic fluid 32 at a high pressure (indicated by hatch lines) and each fluid outlet 68 is used to release the hydraulic fluid 32 at a low pressure after passing through respective planetary gears 60a-60d, 61 as shown by fluid flow direction arrows 70a, 42a. The planetary gears 60a-60d, 61 are caused to rotate in a clockwise direction as indicated by arrows 42.

Complementary gear 62 is caused to rotate in a counter clock-wise direction indicated by arrows 70 when impelled by the rotation of planetary gears, 60a-60d and 63 in the direction of rotation 42 (shown by arrows) imparted by the high pressure of hydraulic fluid 32. Gear teeth 62a of complementary gear 62 are enmeshed with teeth 63a of the oversized planetary gear 63 as well as gear teeth 61 for each planetary gear 60a-60d. Complementary gear 62 thus revolves with output shaft axle 72 which provides torque to a load shaft (not shown) of an outside load connected mechanically to output shaft axle 72.

The combined rotation of all six planetary gears 60a-60d, 63 when fully activated, provides a dual-use for the hydraulic power converter which may be operated in the mode of a multiple gear motor for one purpose, and in the mode of a multiple gear pump in another application, all in accordance with the principles of the present invention.

Clockwise rotation of complementary gear 62 in the opposite direction to arrows 70 will transform the power component 94 from a multiple gear motor (see 58 in FIG. 2) into a multiple gear pump (see 74 in FIG. 3). When a mechanical connection is made with either input shaft 72 on complementary gear 62 or oversized planetary gear 63, or optionally and additionally, any shaft axle 72a (those marked with a + center mark) central to any planetary gear 60a-60d,63, at least one of these can be utilized to provide operation in the mode of a multiple gear pump. The embodiment of the invention shown in FIG. 6 is configured and operated so that planetary gears 60a-60d rotate in reverse, with fluid inlet 66 provided with low pressure hydraulic fluid 32 and fluid outlet 68 releasing hydraulic fluid 32 at a high pressure.

Figure 7:
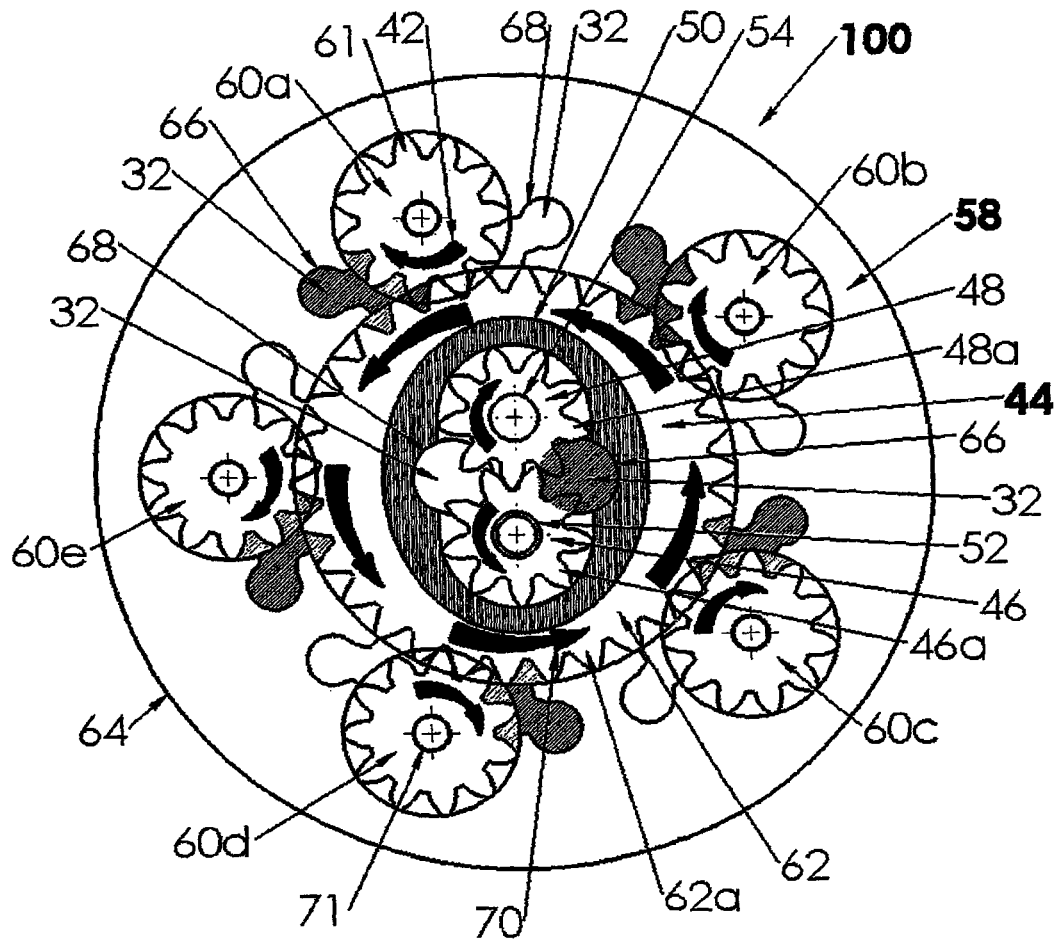
FIG. 7 is a schematic view of a hydrostatic transmission formed with a power component in accordance with the principles of the present invention and operated in motor mode in mechanical and fluid connection with a conventional, gear pump.

FIG. 7 is a schematic view of a power component 58 (see FIG. 2) operated in a mode as a multiple gear motor, hydraulically in communication with a conventional gear pump 44 (see FIG. 1B) to provide a hydrostatic transmission 100 in accordance with the principles of the present invention.

Referring in greater detail to FIG. 7, there is provided a conventional gear pump 44 (see FIG. 1B) provided with a machined fluid inlet 66 and a machined fluid outlet 68 in accordance with the principles of the present invention. Hydraulic fluid 32 is introduced into fluid inlet 66 of conventional gear pump 44 at a low-pressure, but based on mechanical rotation imparted thereto by the engine of a vehicle (not shown) mechanically connected to input shaft axle 52 of a first external-gear 46 in conventional gear pump 44, a high hydraulic pressure of hydraulic fluid 32 is produced at fluid outlet 68 of conventional gear pump 44. Hydraulic fluid 32 is caused to flow to fluid outlet 68 by the rotation of the first external-gear 46 whose teeth 46a enmesh with the teeth 48a of a second external-gear 48.

The high-pressure fluid 32 is introduced into the fluid inlets 66 in communication with each of the planetary gears 60a-60e of hydraulic power converter 58 to cause planetary gears 60a-60e to rotate clockwise as shown by arrows 42. The teeth 62a of complementary gear 62 enmeshed with the teeth 61 of planetary gears 60a-60e, impel the rotation indicated by arrow 70 of complementary gear 62 and causes an output shaft axle 72 (not seen, but refer to FIG. 2) to mechanically transmit the power to a load, such as the differential (not shown) of a vehicle, and/or directly to the vehicle's wheels (not shown). The outcome of the combination of a conventional gear pump 44 with power component 58 of the present invention results in the production of a compact, hydrostatic transmission 100 suitable for application in a wide variety of vehicles and mechanical devices.

Alternatively, the functions of the combination of a conventional gear pump 44 with hydraulic power converter 58 of the present invention can be reversed by reconfiguring the output shaft axle 72 (not visible, but see FIG. 2) to be driven by a vehicle engine (not shown). The conventional gear pump 44 will then operate as a multiple-speed, external-gear motor as heretofore described (see FIG. 1B).

Figure 8:
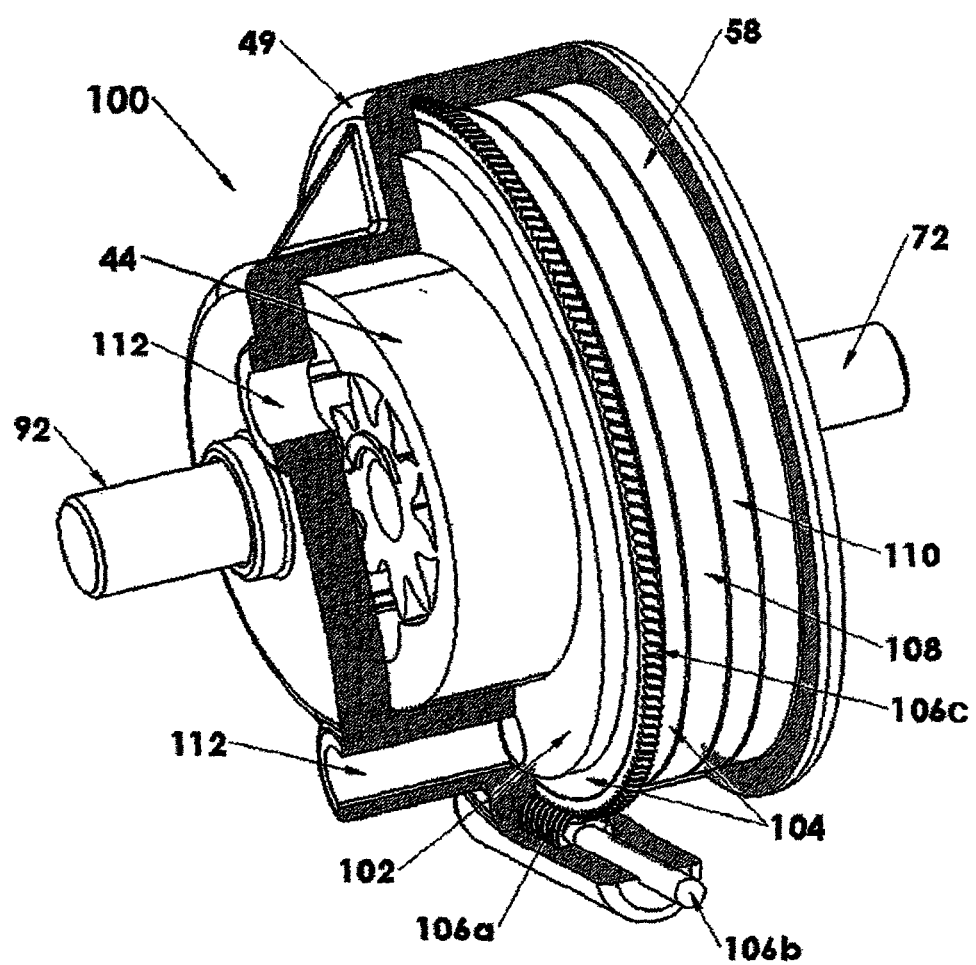
FIG. 8 is a partially cut-away, orthographic view of the hydrostatic transmission shown schematically in FIG. 7.

FIG. 8 is a partial cut-away, orthographic view of the embodiment of the present invention operated as hydrostatic transmission as shown schematically in FIG. 7.

In reference to FIG. 8 generally, hydrostatic transmission 100 is an application of the concept of the present invention wherein a conventional gear pump 44 (as shown in FIG. 1B) is combined with a power component 58 of the present invention (as shown in FIG. 2) operating in the mode of a multiple gear motor. Hydrostatic transmission 100 comprises at a proximal end an input drive shaft 92 mechanically connected to a vehicle engine (not shown) and at a distal end is provided with an output shaft 72 to transmit power to a vehicle differential (not shown) and/or directly to the wheels of a vehicle.

In sequential order between shaft 92 and shaft 72, are arranged the following major elements: a conventional gear pump 44; a static spread plate 102; a rotatable, multi-function selector plate 104 on the circumference of which is mounted a worm-gear track 106c engaged with a worm gear 106a attached to an extended worm-gear drive shaft 106b; a static fluid guidance plate 108; a static inlet/outlet guidance plate 110 for guiding hydraulic fluid 32 (see FIG. 7) to selected fluid inlets 66 and fluid outlets 68 of power component 58 as described in detail in reference to FIG. 2. Built-in low pressure lines 112 lead to and/or from a reservoir (not shown) and/or a heat exchange (not shown).

Referring now to FIG. 8 in greater detail, a conventional gear pump 44 (see FIG. 1B) encased in a casing 50 (see FIG. 1B) is mechanically driven by, for example, a vehicle engine drive shaft (not shown) that also functions as an input shaft 92 in relation to hydrostatic transmission 100, and produces the high hydraulic pressure needed to drive a multi-speed, power component 58 when operated in the mode of a multiple gear motor. In effect, input shaft 92 activates a conventional gear pump 44 which transfers power along a fluid path (not shown) via the series of major elements describe above to impel output shaft 72, acting as an output drive shaft in this exemplary embodiment of the present invention, to transmit power to the differential (not shown) of a vehicle, and/or directly to a vehicle's wheels in an efficient manner.

In an optional, reverse operation, the functions of the hydrostatic transmission 100 can be changed so that shaft 72 can be driven by the vehicle engine allowing power component 58 to operate in the mode of a multi-speed, multiple gear pump 74 (see FIG. 3), and conventional gear pump 44 then is operated as a hydraulic gear motor (FIG. 1B) and, as required by the reverse operation, inlet 38 and outlet 40 are caused to operate in reverse fluid flow and with reversal in pressure levels accordingly from low-to-high to high-to-low, thereby operating as a conventional gear motor (not shown).

The whole hydrostatic transmission 100 is enclosed in a sealed transmission casing 120 that is constructed as a compact envelope for power component 58, the conventional gear pump 44, the various plates 102, 104, 108, and 110 and related parts involved.

It should be noted that the automatic hydraulic transmission 100, utilizing the principles of the present invention, is advantageously more compact and more efficient than those of the prior art. Furthermore, the embodiment of the present invention shown in FIG. 8 has fewer parts and saves costs of manufacturing over prior art devices having the same or similar function.

Figure 9:
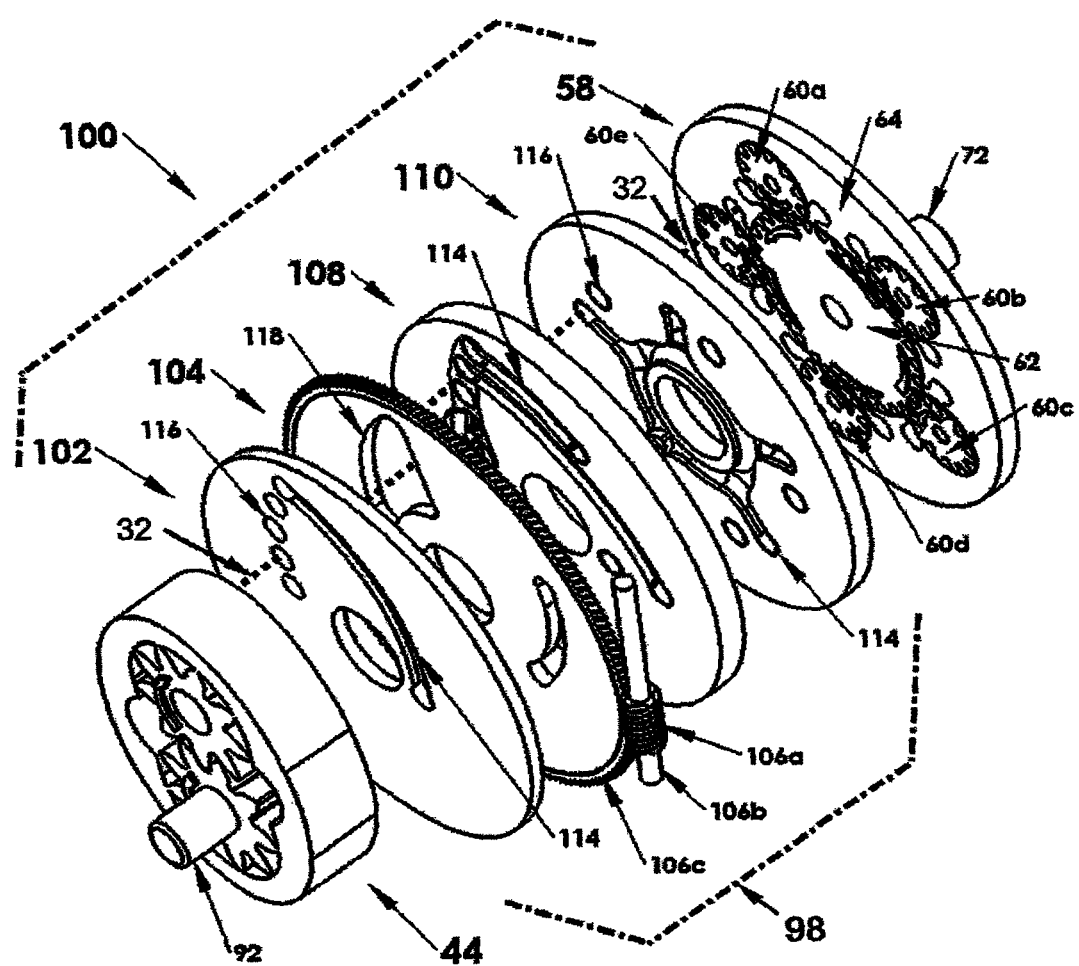
FIG. 9 is an exploded view of the hydrostatic transmission of the present invention shown in FIGS. 7-8, but presented with the gear casing removed for clarity.

FIG. 9 is an exploded view of the embodiment of the present invention shown in FIG. 8, but presented with the gear casing 120 (FIG. 8) removed for clarity.

Referring now to FIG. 9 in detail, the components of hydrostatic transmission 100 include six major elements: a conventional gear pump 44 (as shown, for example, in FIG. 1B) provided with an input shaft 92; a spread plate 102 provided with grooved channels 114 and drilled orifices 116 for appropriate distribution of hydraulic fluid 32 (see FIG. 7) introduced at high pressure from an offset outlet (not shown) in gear pump 44; a rotatable selector plate 104 provided with aperatures 118 formed therein to allow various angles and directions of fluid flow between stator spread plate 102 and rotatable selector plate 104; a worm gear 106c mounted around the circumference of selector plate 104 which is shown engaged with a worm 106a mounted on a worm-gear shaft 106b; a static guidance plate 108 which is provided with appropriately grooved channels 114 and drilled orifices 116 to guide hydraulic fluid 32 (see FIG. 7) further; a static inlet/outlet guidance plate 110 also grooved with channels 114 and drilled with orifices to further guide hydraulic fluid 32 to flow towards selected fluid inlets 66 and fluid outlets 68 in carrier stator plate 64 comprising power component 58 rotatably mounted therein and which operates in the mode of a multiple gear motor (see FIG. 2).

Figure 10:
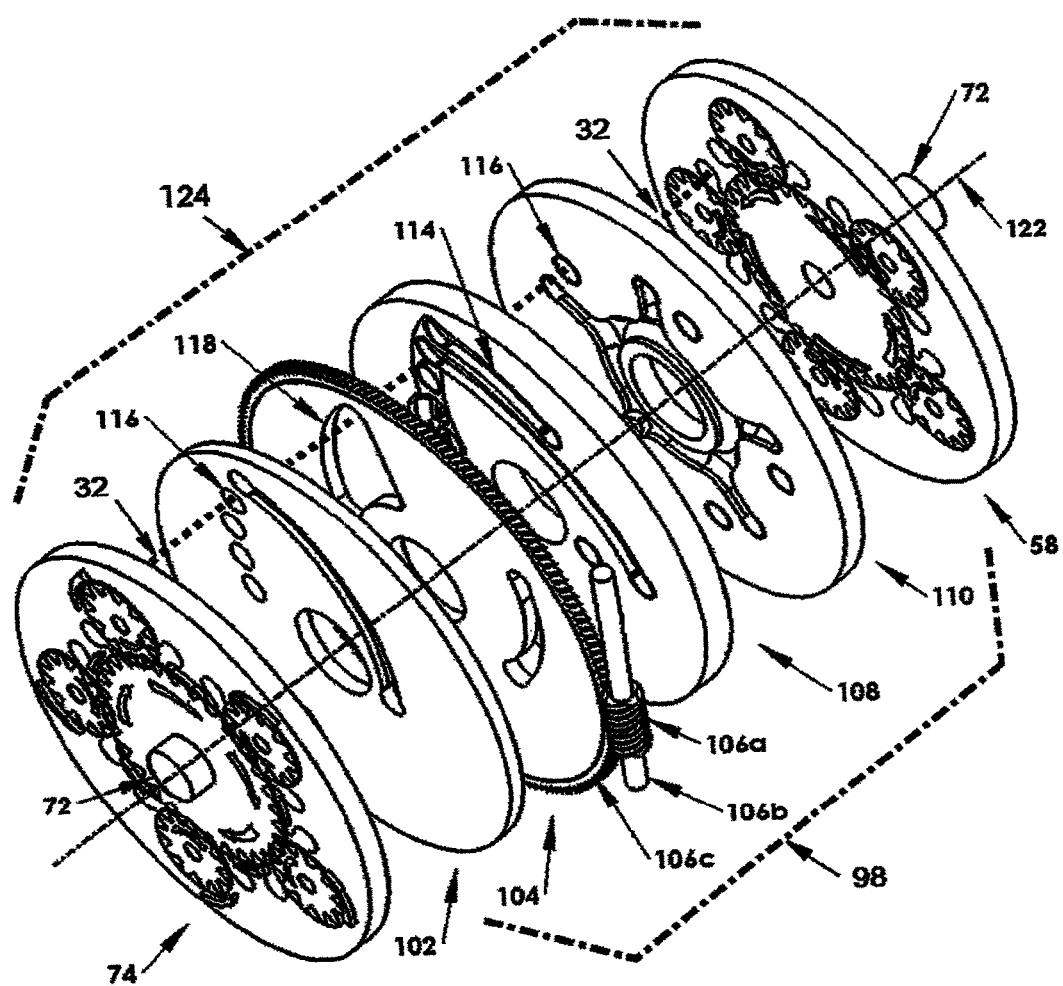
FIG. 10 is an exploded view of an alternate construction of the hydrostatic transmission shown in FIGS. 7-9 wherein a first power component is configured in pump mode and drives a second power component configured in motor mode.

Conventional gear pump 44 and the power component 58 as described above are the major units utilized in hydrostatic transmission 100 and having been described heretofore in respect to FIG. 1B and FIG. 2, respectively, are therefore not recited again in detail in relation to the description of FIG. 9. The combination of plates 102, 104, 108, 110 are intended to direct hydraulic fluid 32 (see FIG. 7) through the various grooved channels 114, drilled orifices 116, and aperatures as shown in FIGS. 9-10, pre-configured as needed to allow smooth fluid flow within the sealed body of the hydrostatic transmission 100. All the component stator plates 102, 108, 110 and 58 are axially aligned within close tolerances and in close proximity to carrier stator plate 64 of power component 58.

A static spread plate 102 faces, with its proximal side, a conventional gear pump 44 which is disposed within a common casing 120 (see FIG. 8), and on a distal side, faces an adjacent, rotatable, multi-function selector plate 104. High-pressure fluid flow from the fluid output 40 (see FIG. 1B) of gear pump 44 is directed to the orifices 116 formed in plate 102. The pressure input point is preset in accordance with specific requirements needed for every gear design. Hydraulic fluid 32 flows in a path (indicated by the broken line 32) from plate 102 through plates, 104, 108, 110 until reaching fluid inlets 66 of power component 58 (see FIG. 7). It should be noted that there is only a hydraulic connection between gear pump 44 and plate 102 although gear pump 44 lies in close proximity to plate 102.

The predetermined, grooved channels 114 and drilled orifices 116 function as built-in tube lines. All the fluid pressure lines are internally embedded in the system advantageously reducing or eliminating the need for lengthy pressure tubes, connectors and fittings as in prior art hydraulic transmissions.

Advantageously, these channels 114 and orifices 116 also act as multiple valves that supply the hydraulic fluid 32 to at least one of the respective fluid inlets 66 of power component 58. Operating in a multiple gear motor mode, power component 58 impels output shaft 72 to rotate at different speeds and moments to produce different torque values on an outside load, for example, for driving a five-speed gear in vehicles and for a reverse gear option.

Selector plate 104 also functions to change the direction of rotation of output shaft 72 of hydrostatic transmission 100, for example, as for reverse at low speed, neutralizing the gear, a half-clutch function, and for limited torque position so as to hold a vehicle against reverse slippage when on a graded road.

Worm-gear shaft 106b (or alternatively, a spur gear coupling—not shown) intermeshes with worm gear 106a which is mechanically connected to selector plate 104. The worm-gear shaft 106b engages with worm gear 106a in order to rotate selector plate 104 to the desired angle for the desired mission needed at every moment. Worm-gear shaft 106b is an outward extension of transmission 100, to enable manual operation and/or servo-motor control of the selector plate 104 angular position.

When the first gear of a vehicle is engaged, maximum torque is required to move the vehicle, and for this all five planetary gears 60a-60e (see FIG. 7) are operated via the hydraulic fluid pressure which enters through multiple fluid inlets 66 in close proximity to these planetary gears 60a-60e. All the fluid inlets 66 open with the maximum fluid pressure applied to the hydrostatic transmission 100. To reverse the rotation in the same situation, the fluid pressure would be applied to the openings of the various selected fluid outlets 68, rather than to the matching fluid inlets 66 and this reverses the rotation of planetary gears 60a-60e and complementary gear 62 (FIG. 7) in the power component 58 so as to rotate output shaft 72 in reverse.

When the hydrostatic transmission is required to operate in second gear, requiring reduced power transmission, only a portion of the plurality of planetary gears 60a-60e are operated; for example, only four of the five illustrated in FIG. 7, by applying fluid pressure to only four inlets 66. This will produce a reduced amount of torque in the hydrostatic transmission 100. The same idea applies to changing to third gear, in which a further reduction of the motor torque is required. In this case, only three planetary gears 60a-c of the five are activated through the fluid inlets 66, and the other two planetary gears 60d and 60e are not supplied with hydraulic fluid 32. The same idea also applies to changing to fourth gear, and fifth gear, respectively in accordance with the status of the transmission torque and speed.

FIG. 10 illustrates in an exploded view an alternative construction of the embodiment of the present invention of FIGS. 8 and 9. In place of the conventional gear pump 44 as shown in FIG. 9, the first element in this alternative construction of a hydrostatic transmission 121 comprises the power component 74 from FIG. 3 of the present invention operated in a multiple gear pump mode. The remaining five components in the sequence are the same as those utilized in the hydrostatic transmission 100 as shown in FIG. 9 and therefore are not recited here again.

The power component 74 is at the proximal end and operates in the mode of a multiple gear pump, while a second power component 58 operates in the mode of a multiple gear motor. The second power component 58 is positioned at the distal end of the sequence of plates 102, 104, 108, and 110, all of which comprise the inner components of hydrostatic transmission 121 which, in FIG. 10, is shown without a transmission casing 120 (see FIG. 8). This combination of components gives a multiple ratio combination for the gears in the first power component 74 compared to those shown in the embodiment of FIG. 9 where the conventional gear pump 44 gives only a single ratio.

Figure 11A:
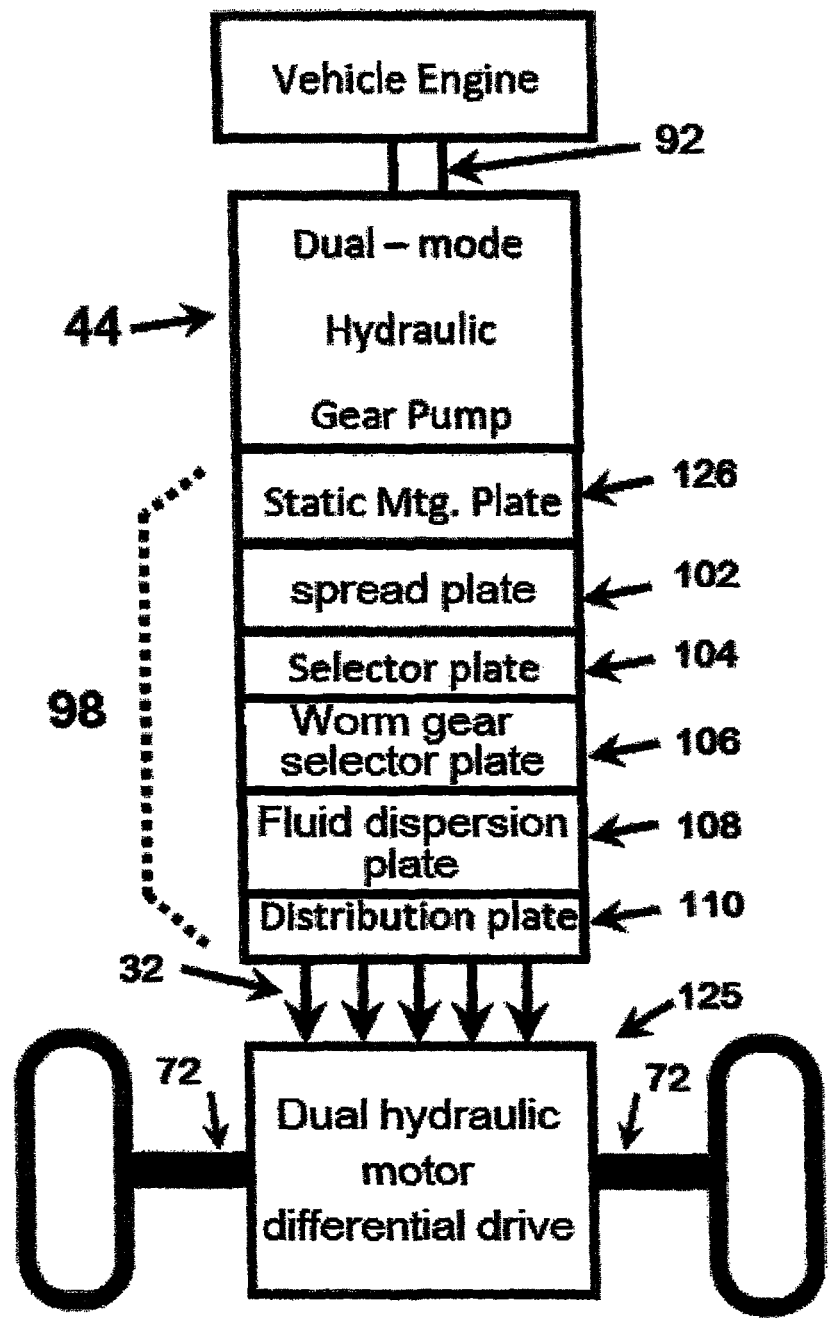
FIG. 11A is a block, system diagram of a differential drive comprising dual power components in still another embodiment of the invention.

FIG. 11A is a block, system diagram of a differential drive comprising dual power components in still another embodiment of the invention. The differential drive system includes a conventional, dual-mode hydraulic gear pump 44, a series of fluid flow guidance and control plates 98, and dual power components 125 acting as a differential drive, being connected mechanically directly to a drive shaft 72 of a motor vehicle, unlike conventional, prior art differentials which utilize a differential device not directly in communication therewith. The dual power components 125 are inherently more efficient because of this arrangement and mark a significant improvement in differential drives over the prior art.

The conventional gear pump 44 is mechanically connected for power to a vehicle engine, such as a car (not shown), via a standard interconnection 132, as is known to those skilled in the art. The conventional pump 44 introduces hydraulic fluid 32 via a series of fluid flow guidance and control plates 98 (as shown in FIGS. 9-10 in detail and described therein).

Figure 11B:
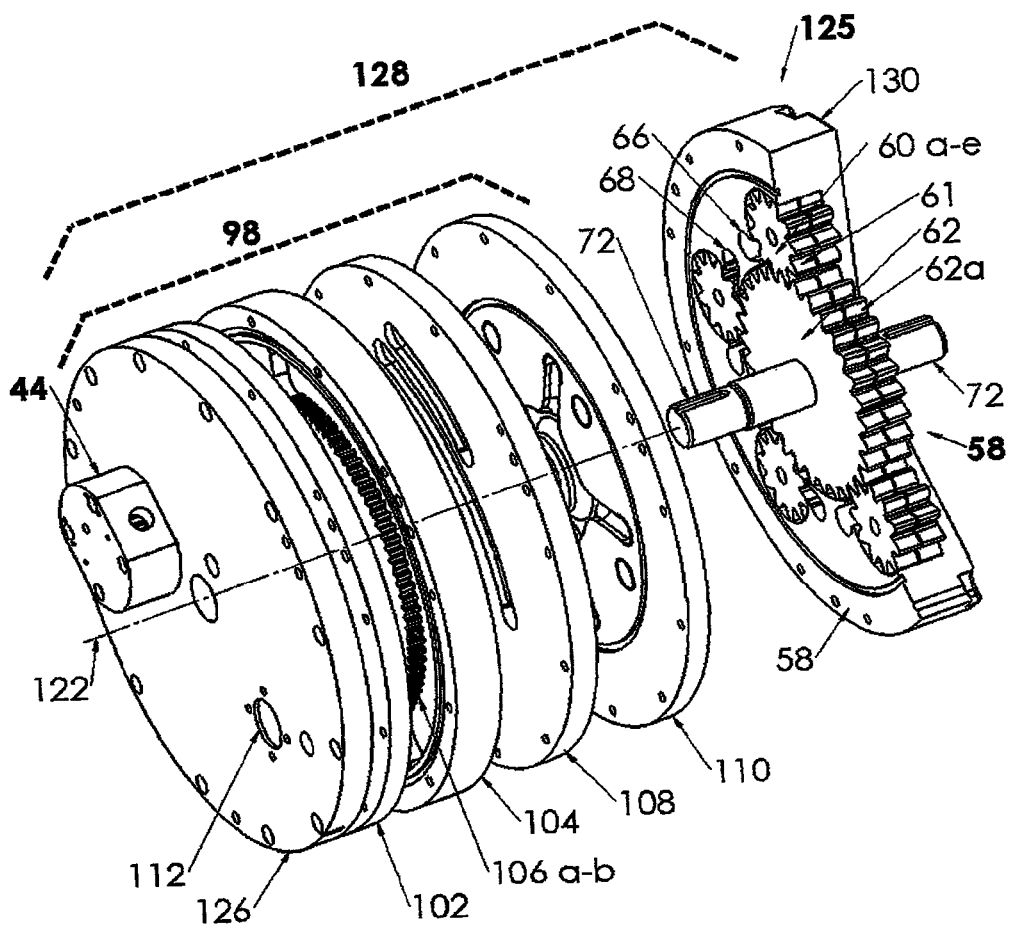
FIG. 11B is an exploded, partially cut-away, detailed view of the embodiment of the invention shown in block system diagram FIG. 11A.

FIG. 11B is an exploded, partially cut-away, detailed view of the embodiment of the invention shown in block system diagram FIG. 11A, comprising a hydrostatic transmission. Hydrostatic transmission 128 utilizes a dual back-to-back configuration of the power component 58 of FIG. 9, but in motor mode, operates as a differential drive 125. Item 98 illustrates the collective components as seen in FIGS. 9-10 which, excluding a dual hydraulic gear pump 44, operate as selection and guidance elements for the hydraulic fluid 32 (not shown) used in hydrostatic transmission 128.

The differential drive 125 of the present invention includes a dual, back-to-back set of hydraulic power converter 58 each one operating in motor mode. Each power component 58 comprises a plurality of planetary gears 60a-e with a complementary sun gear 62 as described heretofore in relation to FIG. 2. The dual set of power component 58 is mounted in close proximity within a compact casing 130. Sun gears 62 drive each power component 58 to operate as multiple, gear motors working independently of one another, although they sit in the same casing 130. Differential drive 125 receives high pressure hydraulic fluid 32 via inlets 66 and is provided with hydraulic fluid outlets 68 as described heretofore in relation to FIG. 2. Each hydraulic power converter 58 operating as multiple, gear motors is free to rotate independently on separate shafts 72 relative to each other and at a different speed or equal speed according to the external load upon a motor vehicle's wheels (not shown), or depending on the radius of rotation of the wheels.

For example, the right-side drive shaft 72 is connected to the right drive wheel of a motor vehicle while a left-side drive shaft 72 is connected to the left drive wheel of the vehicle. These output shafts 72 rotate at the same speed while the vehicle moves in straight path, but will rotate at different speeds while supplying the same torque to the drive wheels when the vehicle moves along a road in a curved path.

Figure 12A:
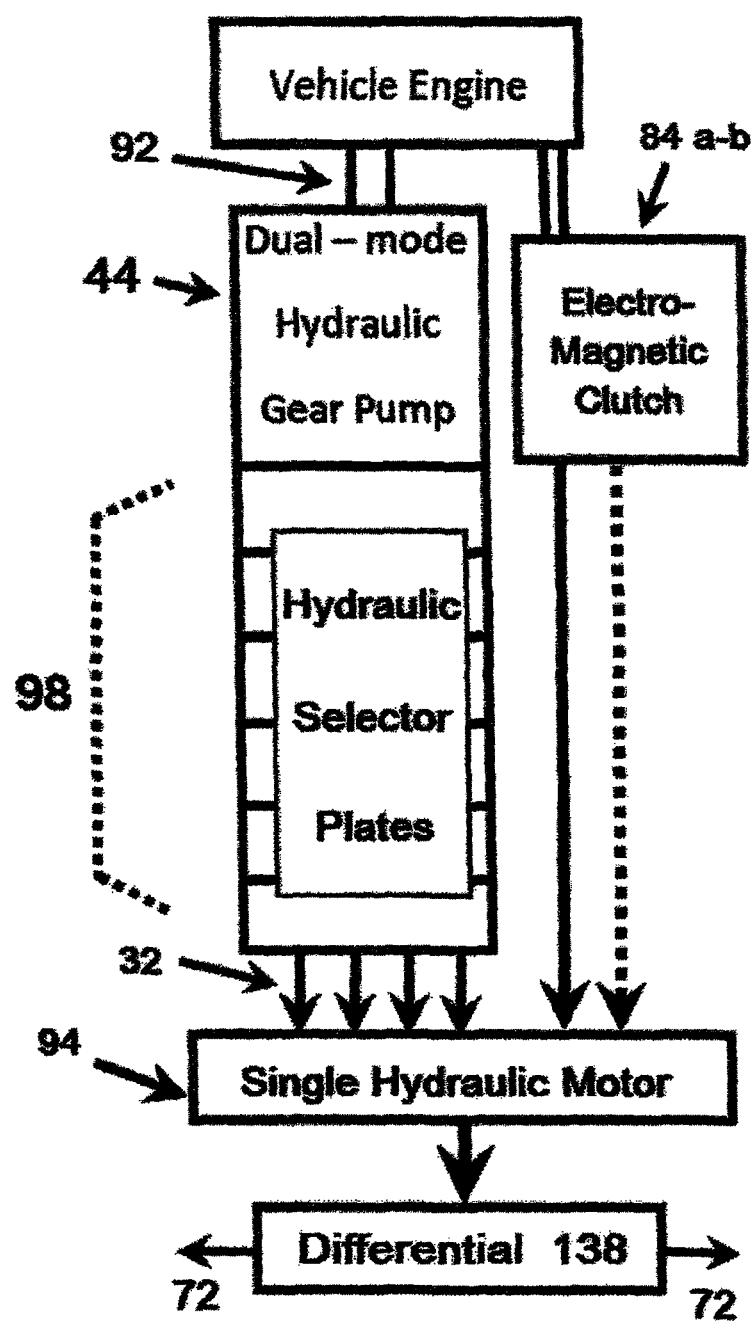
FIG. 12A is a block, system diagram showing an alternative embodiment of the invention utilizing an electromagnetic clutch in communication with a single power component operating in motor mode as multiple, gear motors to automatically operate a conventional metallic gear differential.

FIG. 12A is a block, schematic diagram showing an alternative embodiment of the system of the invention which utilizes a single hydraulic motor 94 acting in concert with a prior art gear pump 44 and an electro-magnetic clutch 84a-b for braking or switching gear speeds.

The conventional, hydraulic gear pump 44 is provided with a series (not shown) of hydraulic guidance and selector plates 98 (see FIG. 11A) and an electro-magnetic clutch 84a-b to control the operation of power component 94.

Power component 94 operates in motor mode as a single motor which is mechanically connected (shown by arrow) to a conventional, prior art metallic gear differential 138 to power the left and right (signified by arrows 72) drive wheels (not shown) of a motor vehicle which are rotatably and independently connected to differential 138.

This combination provides an economy mode to the operation of an automatic hydrostatic transmission with the addition of the electro-magnetic clutch 84a-b. The basic automatic transmission of this invention has the benefits of smooth gear change from parking through neutral and until the fifth gear. Since hydraulic systems are of relative low efficiency the present invention takes advantage of this low efficiency for a smooth gear change, and with some leakage control, a conventional prior art converter can be eliminated. Usually such a converter is used as a slip clutch in between the vehicle motor and prior art conventional automatic gear transmissions.

Although when the motor vehicle has reached cruising speed it can be shifted into an economy or overdrive mode by utilizing a bypass connection of the motor output shaft directly to the drive shaft of the wheels of the vehicle. The bypass connection can be done by any kind of friction clutch, thereby returning the hydraulic system to an idle position.

Figure 12B:
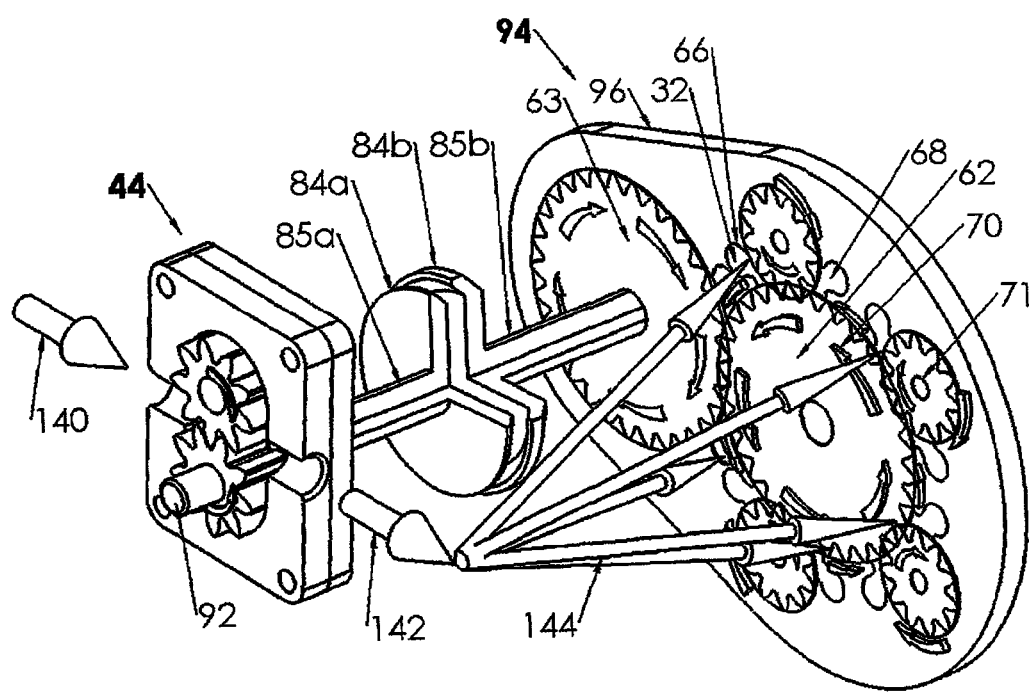
FIG. 12B is a detailed orthographic view of the embodiment shown in FIG. 12A.

Referring to FIG. 12B in detail, there is shown an embodiment of the invention of an automatic hydraulic transmission which features an innovative arrangement of components to operate a motor vehicle in economy mode when moving at cruising speeds. The basic automatic transmission of this invention has the benefits of a smooth gear shift from parking, through neutral, and up to and including changing into fifth gear. Since hydraulic systems are of relatively low efficiency, this embodiment of the present invention takes advantage of this low efficiency for making smoother gear shifting than in prior art hydraulic transmission systems. With some leakage control, conventional prior art converters can be eliminated. They are usually used as a slip clutch between the vehicle motor and prior art conventional automatic gear transmissions. When the vehicle has reached cruising speed, it can move to an economy mode by a bypass connection of the motor output shaft directly to the drive shafts of the vehicle's wheels. The bypass connection can be done by any kind of overdrive friction clutch having a ratio of 1:1, as is known to those skilled in the art, and when the friction clutch is deployed, the hydraulic system will then be reset to an idle position.

Figure 13A:
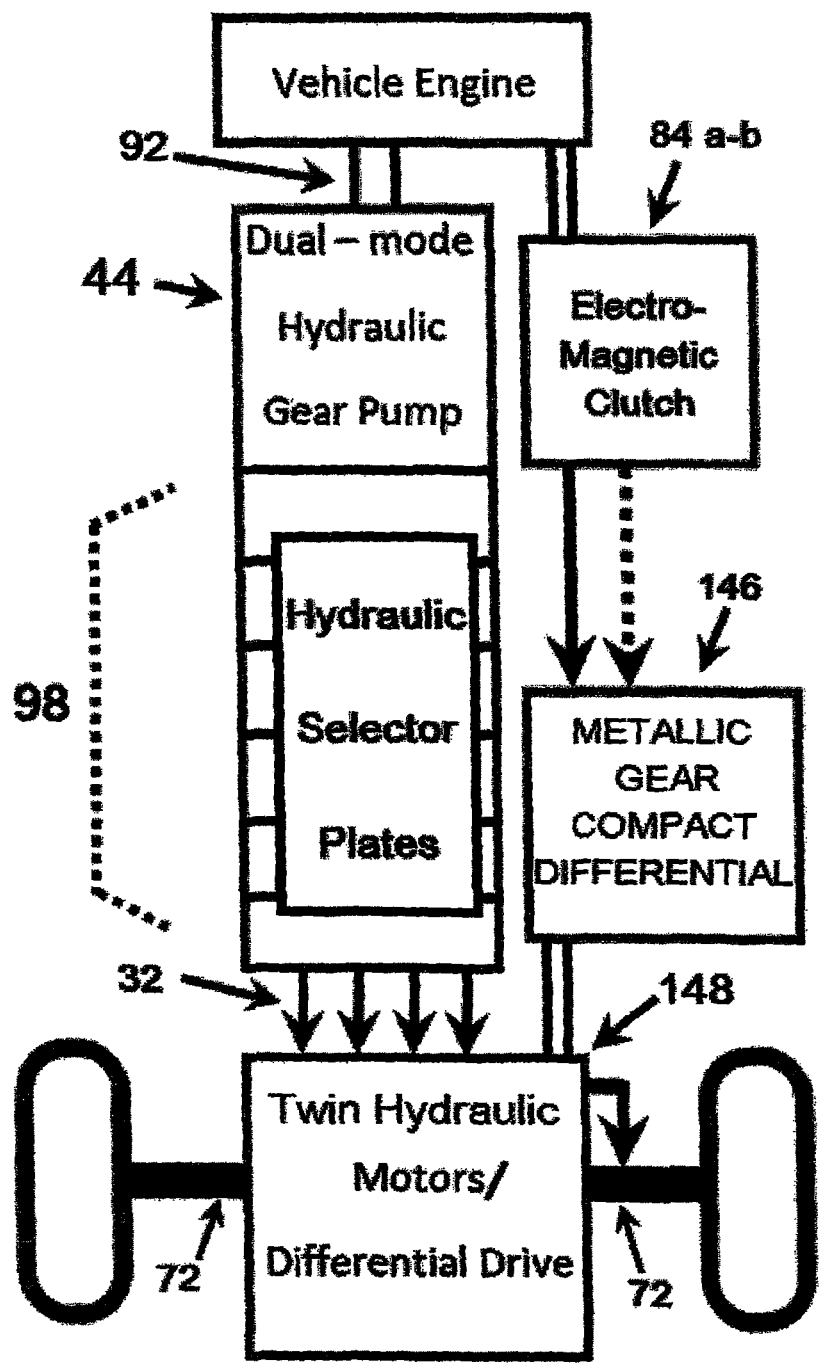
FIG. 13A is a block, system diagram showing yet another embodiment of the present invention utilizing twin power components operating in tandem in motor mode to provide a differential drive.

FIG. 13A is a block, system diagram showing yet another embodiment of the present invention utilizing twin power components operating in tandem in motor mode to provide a differential drive.

The differential drive system illustrated in block diagram in FIG. 13A comprises: a conventional hydraulic pump 44 mechanically in communication 132 with a vehicle engine for power; a series of selector plates 98 (see FIG. 11B) used for selection and control of hydraulic fluid 32; a standard electro-magnetic clutch 84a-b connected mechanically (arrows) to a vehicle engine; and a twin hydraulic motors differential drive 148 mechanically in communication (shown by arrows) with a conventional, compact, metallic gear differential 146 (hereinafter called a conventional gear differential 146) as is known to those skilled in the art and further connected mechanically to the independently rotatable, wheel drive axles 72 of a motor vehicle (not shown).

It should be understood that the combination of a conventional gear differential 146 with the twin hydraulic motors differential drive 148 provides two parallel transmission modes. For maximum convenience, the twin hydraulic motors differential drive 148 is operated while the conventional gear differential 146 is disengaged and remains idle. Alternatively, in a second mode, for better efficiency in cruise speed, conventional gear differential 146 is operated while the twin hydraulic motors differential drive 148 is disengaged and remains idle.

Figure 13B:
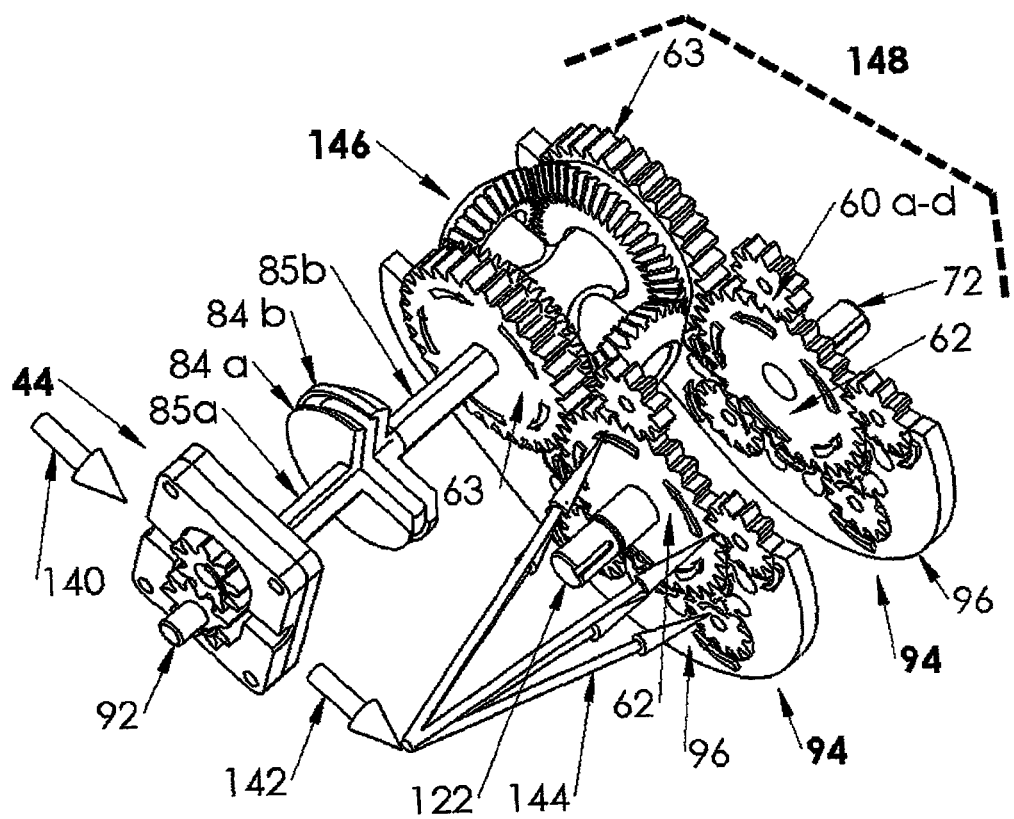
FIG. 13B is a detailed orthographic view of the components of the embodiment from FIG. 13A.

FIG. 13B is a detailed orthographic view of the components of the embodiment from FIG. 13A. The components comprise a conventional gear pump 44 (see FIG. 1A); an electro-magnetic clutch 84a-b; a conventional gear differential 146; and twin hydraulic power components 94 operating in motor mode, but configured to operate at various speeds independently of each other as twin hydraulic motors differential drive 148.

Hydraulic fluid 32 (indicated by solid arrow 140) is supplied to a conventional gear pump 44 which is mechanically connected by a first shaft 85a to the electro-magnetic clutch 84a-b. Electro-magnetic clutch 84a-b functions to brake and control conventional gear differential 146 via a second shaft 85b which is free to rotate at a different speed than the first shaft 85a.

Each power component 94 of the twin set comprises multiple, planetary gears 60a-d, 63, the latter gear being oversized (also see FIG. 6). All planetary gears are arranged in a stator plate 96 around a sun gear 62. Hydraulic power component 94 can operate in one of a pump mode and a motor mode depending on a particular application, but in the embodiment shown herein the set is configured to operate in motor mode.

Hydraulic fluid 32 (indicated by solid arrow 142) is ejected from the fluid outlet 40 (see FIG. 1B) at high pressure and distributed selectively (multiple solid arrows 144) to the fluid inlets 66 (see FIG. 11B) to selectively activate at least one of the plurality of planetary gear 60a-d, 63. A series of hydraulic selector plates 98 (see FIG. 9) is used for selection and control of hydraulic fluid 32 in the system as shown by solid arrows 142, 144.

Each oversize planetary gear 63 is mechanically and axially connected to the conventional, differential drive 146 on opposite sides thereof. Oversize planetary gear 63 is in communication with one clutch plate 84b of electro-magnetic clutch 84a-b via a clutch shaft 85b. Electro-mechanical clutch 84a-b is disposed between the conventional gear pump 44 and the oversize planetary gear 63 via clutch shaft 85a. The electro-magnetic clutch 84a-b is connected to conventional differential 146 so as to provide smooth shifting between various drive speeds provided by the multiple, planetary gears 60a-d in combination with the dual, oversized planetary gears 63 which allows for selective gear speeds and direction of rotation, including reverse operation of the conventional differential 146.

Having described the present invention with regard to certain specific embodiments thereof, it is to be understood that the description is not meant as a limitation, since further modifications may now suggest themselves to those skilled in the art, and it is intended to cover such modifications as fall within the scope of the claims with reference to the attached drawings of the described invention.

We claim:

1. A hydrostatic transmission comprising:
a combination of a first and a second power component configurable to be operated in a multiple gear pump mode and a multiple gear motor mode, respectively, each of the combination comprising:
a plurality of planetary gears mounted on respective planetary gear shafts;
a complementary gear mounted on a shaft and enmeshed with said plurality of planetary gears;
a fluid inlet disposed on one side of and in close proximity adjacent to each of said plurality of planetary gears for ingress of hydraulic fluid;
a fluid outlet disposed on an opposite side of and in close proximity adjacent to each of said plurality of planetary gears for egress of hydraulic fluid; and
a carrier stator plate in which said plurality of planetary gears and said complementary gear are aligned in the same plane as said carrier stator plate, and are rotatably mounted therein,
wherein said complementary gear shaft of said first power component is mechanically connected to a power source, and said complementary gear shaft and at least one of said planetary gear shafts of said second power component is mechanically connected to a load,
wherein when said first power component operates in a mode as a multiple gear pump in conjunction with said second power component operating in a mode as a multiple gear motor, said hydraulic fluid is introduced at a low hydraulic pressure into at least one of said respective fluid inlets, and said complementary gear impels said plurality of planetary gears to rotate in concert and thereby supply a predetermined fluid flow to said fluid outlet of said first power component for egress at high pressure therefrom; and
wherein said hydraulic fluid is supplied from said first power component into at least one of said fluid inlets of said second power component at a high pressure so as to impel at least one of said plurality of planetary gears of said second power component to rotate, thereby also causing said respective complementary gear to rotate such that torque is provided to both said complementary gear shaft and at least one of said plurality of planetary gear shafts at a predetermined controllable speed thereby efficiently operating said hydrostatic transmission.

2. The hydrostatic transmission of claim 1, wherein said complementary gear is a sun gear.

3. The hydrostatic transmission of claim 1, wherein said complementary gear is an internal ring-gear disposed circumferentially around said stator plate and aligned in the same plane as said plurality of planetary gears whose said teeth enmesh with teeth of said internal ring-gear.

4. The hydrostatic transmission of claim 1, wherein said plurality of planetary gears comprises between 2 to 30 planetary gears of equal size.

5. The hydrostatic transmission of claim 4, wherein said plurality of planetary gears includes one, larger-size planetary gear mounted on a gear shaft for providing a variable speed operation of said power component when configured in motor mode and activated.

6. The hydrostatic transmission of claim 1, wherein said first power component comprises a conventional gear pump whose hydraulic fluid egress is via a series of selection and guidance plates in fluid communication with said conventional gear pump.

7. The hydrostatic transmission of claim 6, wherein said series of selection and guidance plates comprises in sequence:
   a static spread plate disposed in close proximity and adjacent to said conventional gear pump for fluid flow disposition of said hydraulic fluid received from said conventional gear pump;
   a hydraulic selector plate disposed in close proximity adjacent to said static spread plate for controlling said fluid flow disposition;
   a fluid guidance plate disposed adjacent to said hydraulic selector plate for further refinement of fluid flow disposition; and
   an inlet-outlet guidance plate disposed adjacent to said fluid guidance plate for selection of inlets and outlets for fluid flow.

8. The hydrostatic transmission of claim 1, wherein said first power component, operating in pump mode, functions as a multiple gear pump.

9. The hydrostatic transmission of claim 1, wherein said second power component, operating in motor mode, comprises a dual unit of hydraulic motors mounted back-to-back in a single housing, each operable independently at variable speeds so as to act as a differential drive.

10. The hydrostatic transmission of claim 9, wherein said one, larger-size planetary gear is mechanically in communication with an electro-magnetic clutch.

11. The hydrostatic transmission of claim 1, wherein said second power component, operating in motor mode with said plurality of planetary gears includes one, larger-size planetary gear mounted on a gear shaft for providing a variable speed operation of said hydraulic transmission.

12. The hydrostatic transmission of claim 11, wherein said second power component, operating in motor mode, is configured as twin hydraulic gear motors each of which is selectively and independently operable at different speeds to act as a differential drive in combination with a conventional gear differential.

13. The hydrostatic transmission of claim 12, wherein said combination provides two parallel transmission modes, wherein a first mode comprises operating said twin hydraulic motors differential drive while said conventional gear differential is disengaged and remains idle, whereas a second mode comprises operating said conventional gear differential while said twin hydraulic motors differential drive is disengaged and remains idle.

14. A method for operating a hydrostatic transmission comprising:
   providing a combination of a first and a second power component configurable to be operated in a multiple gear pump mode and a multiple gear motor mode, respectively, each of the combination comprising:
   a plurality of planetary gears mounted on respective planetary gear shafts;
   a complementary gear mounted on a shaft and enmeshed with said plurality of planetary gears;
   a fluid inlet disposed on one side of and in close proximity adjacent to each of said plurality of planetary gears for ingress of hydraulic fluid;
   a fluid outlet disposed on an opposite side of and in close proximity adjacent to each of said plurality of planetary gears for egress of hydraulic fluid; and
   a carrier stator plate in which said plurality of planetary gears and said complementary gear are aligned in the same plane as said carrier stator plate, and are rotatably mounted therein, and operating said first power component in a mode as a multiple gear pump in conjunction with operating said second power component in a mode as a multiple gear motor,
   wherein said complementary gear shaft of said first power component is mechanically connected to a power source, and wherein said complementary gear shaft and at least one of said planetary gear shafts of said second power component is mechanically connected to a load,
   said operating comprising:
   introducing said hydraulic fluid at a low hydraulic pressure into at least one of said respective fluid inlets of said first power component, such that said complementary gear impels said plurality of planetary gears to rotate in concert and thereby supply a predetermined fluid flow to said fluid outlet of said first power component for egress at high pressure therefrom; and
   introducing said hydraulic fluid from said fluid outlet of said first power component into said second power component, such that said hydraulic fluid is supplied from said first power component into at least one of said fluid inlets of said second power component at a high pressure so as to impel at least one of said plurality of planetary gears of said second power component to rotate,
   thereby also causing said respective complementary gear to rotate such that torque is provided to both said complementary gear shaft and at least one of said plurality of planetary gear shafts at a predetermined controllable speed thereby efficiently operating said hydrostatic transmission.

15. The operating method of claim 14, wherein said first power component, operating in pump mode, functions as a multiple gear pump.

16. The operating method of claim 14, wherein said second power component, operating in motor mode, comprises a dual unit of hydraulic motors mounted back-to-back in a single housing, each operable independently at variable speeds so as to act as a differential drive.

17. The operating method of claim 14, wherein said second power component, operating in motor mode with said plurality of planetary gears includes one, larger-size planetary gear mounted on a gear shaft for providing a variable speed operation of said hydraulic transmission.

18. The operating method of claim 14, wherein said second power component, operating in motor mode, is configured as twin hydraulic gear motors each of which is selectively and independently operable at different speeds to act as a differential drive in combination with a conventional gear differential.

19. The operating method of claim 18, wherein said combination provides two parallel transmission modes, wherein a first mode comprises operating said twin hydraulic motors differential drive while said conventional gear differential is disengaged and remains idle, whereas a second mode comprises operating said conventional gear differential while said twin hydraulic motors differential drive is disengaged and remains idle.

* * * * *